(12) United States Patent
Hironaka

(10) Patent No.: US 11,513,009 B2
(45) Date of Patent: Nov. 29, 2022

(54) TEMPERATURE SENSOR

(71) Applicant: DENSO CORPORATION, Kariya (JP)

(72) Inventor: Masaki Hironaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 16/733,579

(22) Filed: Jan. 3, 2020

(65) Prior Publication Data

US 2020/0141812 A1    May 7, 2020

Related U.S. Application Data

(63) Continuation of application No. PCT/JP2018/025216, filed on Jul. 3, 2018.

(30) Foreign Application Priority Data

Jul. 4, 2017   (JP) .............................. JP2017-131240

(51) Int. Cl.
     *G01K 7/22*      (2006.01)
     *B23K 26/21*     (2014.01)
     *H01C 1/144*     (2006.01)

(52) U.S. Cl.
     CPC ................ *G01K 7/22* (2013.01); *B23K 26/21* (2015.10); *H01C 1/144* (2013.01)

(58) Field of Classification Search
     None
     See application file for complete search history.

(56) References Cited

U.S. PATENT DOCUMENTS

| 2002/0084884 | A1* | 7/2002 | Takahashi | ................ | G01K 7/22 |
| | | | | | 374/E7.028 |
| 2009/0323765 | A1* | 12/2009 | Yokoi | ....................... | G01K 1/08 |
| | | | | | 374/185 |
| 2018/0252595 | A1* | 9/2018 | Sato | ......................... | G01K 7/22 |

* cited by examiner

*Primary Examiner* — Erica S Lin
(74) *Attorney, Agent, or Firm* — Nixon & Vanderhye P.C.

(57) ABSTRACT

A temperature sensor provided with: an element that comprises a resistor which has a resistance value that changes with temperature thereof, and a lead wire; a signal wire that is bonded to the lead wire by welding; and a cover that covers the element and a welded part between the lead wire and the signal wire, where the lead wire comprises a material in which oxide particles are dispersed in platinum or platinum alloy; and the welded part has a welded part interface region along an interface with the lead wire or the signal wire, and a welded part main region inside thereof, and a volume ratio of the oxide particles occupying the welded part interface region is larger than a volume ratio of the oxide particles occupying the welded part main region.

7 Claims, 8 Drawing Sheets

TEMPERATURE SENSOR

CROSS-REFERENCE TO RELATED APPLICATION

The present application is a continuation application of International Application No. PCT/JP2018/025216, filed Jul. 3, 2018, which claims priority to Japanese Patent Application No. 2017-131240, filed Jul. 4, 2017. The contents of these applications are incorporated herein by reference in their entirety.

BACKGROUND

1. Technical Field

The present disclosure relates to a temperature sensor.

2. Related Art

For example, in a control device, an exhaust gas purification device and the like of a gasoline engine or a diesel engine used for vehicles, temperature sensors are used to detect the temperature of each part. The temperature sensors are composed using a resistor which has a resistance value that changes with temperature thereof, and, for example, an element using a thermistor, an element using a platinum temperature measuring resistor and the like are known. These elements have a lead wire using platinum or a platinum alloy, and are bonded to a signal wire for external extraction in a cover.

SUMMARY

The present disclosure provides a temperature sensor. One mode of the present disclosure is a temperature sensor provided with an element, a lead wire, a signal wire and a cover. The element has a resistor which has a resistance value that changes with temperature thereof, and a lead wire drawn out from the resistor. The signal wire is bonded to the lead wire by welding. The cover covers the element and a welded part of the lead wire and the signal wire. The lead wire comprises a material in which oxide particles are dispersed in platinum or platinum alloy. The welded part has a welded part interface region along an interface with the lead wire or the signal wire, and a welded part main region inside thereof, and a volume ratio of the oxide particles occupying the welded part interface region is larger than a volume ratio of the oxide particles occupying the welded part main region.

DETAILED DESCRIPTION OF THE PREFERRED EMBODIMENTS

Figure 1:
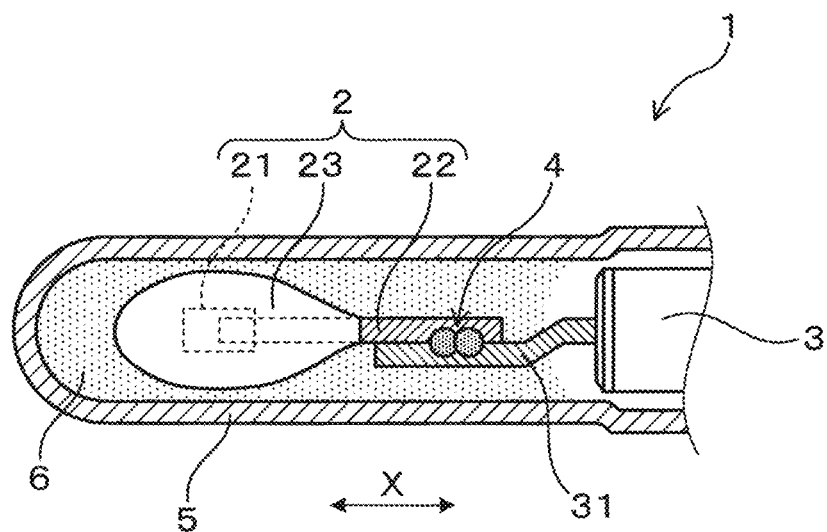
FIG. 1 is a cross-sectional view along the axial direction of the main part of a temperature sensor of a first embodiment.

The inventor of the present disclosure has studied the following technique for a temperature sensor provided with an element using a resistor which has a resistance value that changes with temperature thereof.

In order to comply with recent environmental regulations, for example, engines having superchargers are becoming more common, and the exhaust gas temperature tends to be high as combustion efficiency is improved. As such, the temperature sensors used as exhaust gas temperature sensors are required to withstand use in a harsher environment, for example, use under an installation position where the exhaust gas temperature is 1000° C. or higher. A problem of disconnection of an element lead wire due to thermal stress load arises when attempting to increase high temperature resistance of the temperature sensors, and reinforcement of the lead wire for preventing disconnection has been proposed.

For example, a thermistor type temperature sensor disclosed in JP3666289A uses a dispersion strengthened material, in which platinum or a platinum alloy is used as a main component and oxide particles made of zirconia and the like are added, used for a lead wire from which the thermistor element is drawn out. By suppressing coarsening of crystal particles in the production process of the thermistor element, the dispersion strengthened material, for example, attempts to prevent disconnection caused by strong vibration in the high frequency range of an engine in addition to thermal stress generated by use in an environment that fluctuates from around −40° C. to around 1000° C.

In the meantime, heat resistance of elements was studied under a high temperature environment in which the temperature of an exhaust gas exceeded 1000° C., and it was found that a desired strength was not necessarily obtained even when a dispersion strengthened material was used for the lead wire. In particular, in the welded part for bonding the lead wire and the signal wire together, the dispersibility of the oxide particles deteriorates caused by a melting point or higher occurring due to the application of welding heat, and strength of the welded part becomes lower than those of other parts. In addition, when the dispersibility of the oxide particles is deteriorated, a pinning force exerted by the oxide particles is impaired, and therefore the crystal particles become coarser every time a thermal load is applied under a usage environment exposed to high-temperature exhaust gas, and a problem that the strength of the welding part further deteriorates was found.

The object of the present disclosure is to provide a temperature sensor having excellent high heat resistance, by ensuring the strength in the welded part of the lead wire and the signal wire of the element, and being able to suppress strength deterioration caused by coarsening of crystal particles even under an environment where a large thermal stress is applied.

One mode of the present disclosure is:

a temperature sensor provided with an element that has a resistor which has a resistance value that changes with temperature thereof, and a lead wire drawn out from the resistor;

a signal wire that is bonded to the lead wire by welding; and a cover that covers the element and a welded part of the lead wire and the signal wire, where the lead wire comprises a material in which oxide particles are dispersed in platinum or platinum alloy, and the welded part has a welded part interface region along an interface with the lead wire or the signal wire, and a welded part main region inside thereof, and a volume ratio of the oxide particles occupying the welded part interface region is larger than a volume ratio of the oxide particles occupying the welded part main region.

According to the embodiment mentioned above, since more oxide particles with a large rigidity modulus are present in the welded part interface region which is in the outside of the welded part main region, it is possible to improve the strength of the welded part in the vicinity of the interface. In addition, coarsening of the particle diameter in the welded part interface region is suppressed by many oxide particles being dispersed. As a result, even when used in an environment where the temperature is higher than before, the strength deterioration of the welded part interface region caused by coarsening is suppressed, and therefore it is possible to retain heat resistance.

Therefore, it is possible to provide a temperature sensor having excellent high heat resistance, by ensuring the strength in the welded part of the lead wire and the signal wire of the element, and being able to suppress strength deterioration caused by coarsening of crystal particles even under an environment where a large thermal stress is applied.

The object mentioned above, and other objects, features, and advantages of the present disclosure shall be made clearer from the following detailed description with reference to the accompanying drawings.

First Embodiment

A first embodiment according to a temperature sensor shall be described with reference to FIG. 1 to FIG. 7.

As shown in FIG. 1, a temperature sensor 1 of the present embodiment is provided with a thermistor element 2 which is a temperature sensitive element, a core wire 31 as a signal wire, and a cover 5. The thermistor element 2 has a resistor 21 which has a resistance value that changes with temperature thereof, and a lead wire 22, drawn out from the resistor 21, and the core wire 31 is bonded to the lead wire 22 by welding. The cover 5 covers the thermistor element 2 and the welded part 4 between the lead wire 22 and the core wire 31. The core wire 31 protrudes from a sheath pin 3 where one end thereof is inserted into the cover 5.

In the temperature sensor 1, the left and right direction in FIG. 1 is the axial direction X, and the side where the thermistor element 2 is provided in the axial direction X is the tip end side, and the opposite side thereof is the base end side. In addition, in the thermistor element 2, the axial direction X is the element longer side direction, and the lead wire 22 and the core wire 31 are arranged along the element longer side direction.

Such temperature sensor 1 is arranged in an exhaust pipe of an internal combustion engine, for example, a gasoline engine, a diesel engine and the like for a vehicle, and is used as an exhaust gas temperature sensor for measuring the temperature of exhaust gas discharged from the engine. Alternatively, it can be arranged in an optional position of a control device or an exhaust gas purification device and the like of an engine to be applied as a temperature sensor to detect temperature of each part.

Figure 2:
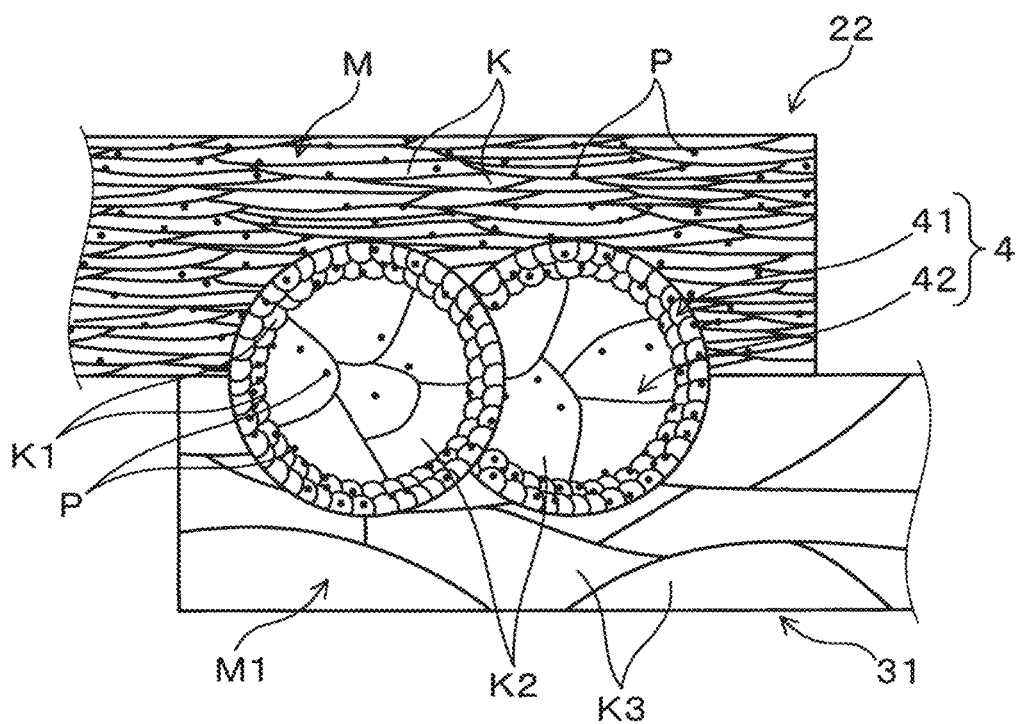
FIG. 2 is a partially enlarged cross-sectional view schematically showing a structure in the vicinity of a welded part of an element of the temperature sensor of the first embodiment.

As shown in an enlarged view in FIG. 2, the lead wire 22 is composed of a material having platinum or a platinum alloy as a base material M, and oxide particles P dispersed in the base material M. The welded part 4 has a welded part interface region 41 along the interface with the lead wire 22 or the core wire 31, and a welded part main region 42 inside thereof, and the volume ratio of the oxide particles P occupying the welded part interface region 41 is larger than the volume ratio of the oxide particles P occupying the welded part main region 42. As such, the welded part interface region 41 is formed so as to surround the entire outer periphery of the welded part main region 42, and concurrently it constitutes the outermost layer portion of the welded part 4 where the oxide particles P are present in larger amounts.

Details of the welded part 4 and the welded part interface region 41 shall be described later.

Figure 3:
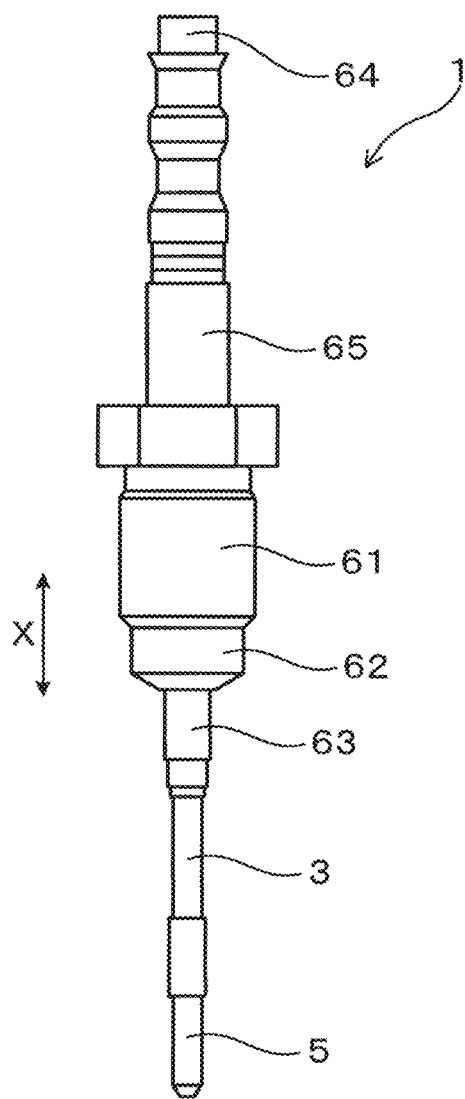
FIG. 3 is an overall composition diagram of the temperature sensor of the first embodiment.

As the entire structure of the temperature sensor 1 is shown in FIG. 3, the temperature sensor 1 is provided with the cover 5 in which the thermistor element 2 and the core wire 31 are accommodated and protected, and the sheath pin 3 which insulates and holds the core wire 31 inside, as well as a nipple 61 for installing the temperature sensor 1 on the exhaust pipe, a rib 62 of an installation part on the exhaust pipe, a guide pipe 63 for holding the outer periphery of the base end side of the sheath pin 3, a wiring part 64 for external drawing, and a protective tube 65 for protecting the wiring part 64. The wiring part 64 is electrically connected to the core wire 31 exposed from the base end side of the sheath pin 3 in the protective tube 65.

The temperature sensor 1 is inserted into the exhaust pipe (not shown in the drawings) with the cover 5 side as the tip end side, and it is fixed by the nipple 61. A signal from the thermistor element 2 is taken out to the outside by the core wire 31 of the sheath pin 3 and the wiring part 64.

In FIG. 1, the cover 5 is a metal cover having a cylindrical shape with a bottom, and the tip end part of the sheath pin 3 is inserted and fixed inside an opening end part thereof The cover 5 is composed of, for example, a nickel alloy, stainless steel or the like. In the space inside the cover 5, the thermistor element 2 is accommodated in the tip end side, and concurrently the lead wire 22 drawn out to the base end side of the thermistor element 2 and the core wire 31 drawn out to the tip end side of the sheath pin 3 are electrically connected by lap welding. The welding method used includes, among others, laser welding and pulse welding.

The outer periphery of the thermistor element 2, and the lead wire 22 and the core wire 31 is filled with a filler 6 for improving the responsiveness and vibration resistance of the thermistor element 2. The sheath pin 3, for example, has a composition in which the core wire 31 is insulated and held in a cylindrical tube made of stainless steel. The core wire 31 is an alloy wire composed of, for example, a nickel alloy, stainless steel or the like. The filler 6 is composed of insulating ceramic particles and the like.

The thermistor element 2 is provided with the resistor 21 which has a resistance value that changes with temperature thereof, the lead wire 22 connected to the resistor 21, and a glass layer 23 that covers portions of the resistor 21 and the lead wire 22. The resistor 21 is composed of, for example, an oxide semiconductor containing manganese, cobalt, nickel, iron and the like, or a ceramic semiconductor material such as a barium titanate-based semiconductor. The glass layer 23 is provided so as to cover the entire resistor 21 and the connecting part between the resistor 21 and the lead wire 22 in order to suppress deterioration of the resistor 21. The lead wire 22 is composed of a noble metal wire containing as the main component pure platinum (i.e., Pt) or a platinum alloy such as a platinum iridium alloy (i.e., a Pt—Ir alloy).

Further, the lead wire 22 is usually composed of a pair of noble metal wires and each of the wires is bonded to each of the pair of the core wires 31. Here, only one of the pair of bonds is shown, but the same applies to the other.

As schematically shown in FIG. 2, the base material M of the lead wire 22 has a structure in which a large number of crystal particles K with elongated shape are aligned in the axial direction X, for example, by performing a wire drawing process. The lead wire 22 is a dispersion strengthened type in which a large number of fine oxide particles P are dispersed in the entire base material M, and the oxide particles P are composed of at least one selected from metal oxides of, for example, zirconia (i.e., $ZrO_2$), yttria (i.e., $Y_2O_3$), alumina (i.e., $Al_2O_3$) and the like. Since these oxide particles P have higher rigidity modulus than that of platinum or a platinum alloy as the base material M, the strength of the lead wire 22 is improved by dispersing the oxide particles P in the base material M.

In the portion where the lead wire 22 and the core wire 31 are overlapped, each of the base material M and the base material M1 are melted by the welding heat, and the welded part 4 is formed by cooling and solidifying the melt. The crystal particles K2 of the welded part main region 42 grow larger than the crystal particles K of the base material M, and the welded part interface region 41 is formed so as to surround the entire outer periphery thereof.

Figure 4:
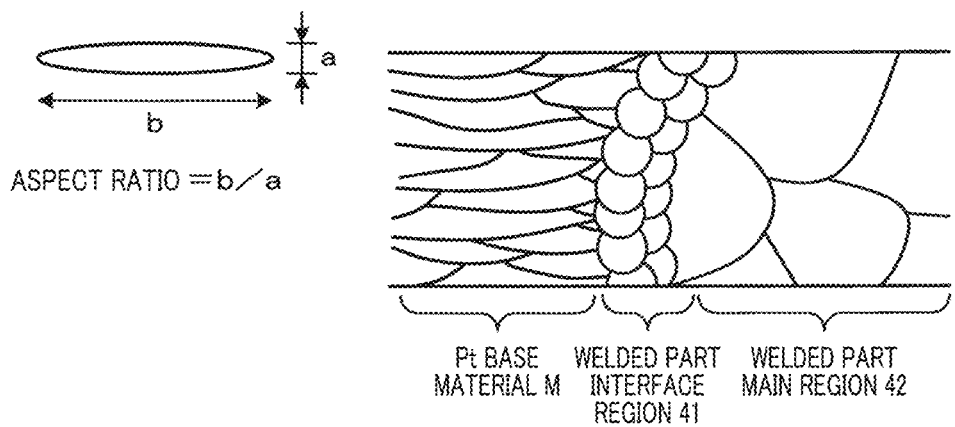
FIG. 4 is a schematic cross-sectional view for explaining the relationship between the shape of the crystal particles and the average particle diameter of the lead wire base material and the welded part of the first embodiment.

Here, the welded part interface region 41 and the welded part main region 42 constituting the welded part 4 are both regions melted by the welding heat, and as shown in FIG. 4, they have crystal shapes and crystal particle diameters that are different from those of the base material M. The welded part interface region 41 forms the outermost layer part of the welded part 4 and it is a region including the interface with the lead wire 22 or the core wire 31. The welded part main region 42, which is inside the welded part interface region 41, is a region including the central part of a part melted by the welding heat, and the crystal particles K have relatively large sizes, since progress of cooling and solidifying becomes slower toward the inner side of the welded part 4.

As a result, the welded part interface region 41 is formed between the welded part main region 42 and the lead wire 22 and between the welded part main region 42 and the core wire 31. In addition, the volume fraction occupied by the oxide particles P in the welded part interface region 41 is composed to be larger than the volume fraction occupied by the oxide particles P in the welded part main region 42. That is, the volume ratio occupied by the oxide particles P is "the welded part interface region 41>the welded part main region 42". This relationship holds true in both the outer layer part in the axial direction X and the outer layer part in the direction orthogonal thereto of the welded part 4, and preferably it is desirable that the relationship holds true in the entirety of the welded part 4. At this time, by the presence of more oxide particles P in the welded part interface region 41 where stress is likely to concentrate, the region including the interface with the lead wire 22 or the core wire 31 is strengthened, and deterioration of strength by heat in a usage environment can be suppressed.

Preferably, in the welded part 4, the volume ratio of the oxide particles P in the welded part interface region 41 is desirably 0.08 vol % or more. Thereby, the amount of the oxide particles P present in the welded part interface region 41 becomes sufficiently large, and the effect of strengthening the welded part 4 is enhanced. In particular, in the welded part interface region 41 formed between the lead wire 22 and the welded part main region 42, since the lead wire 22 supports the thermistor element 2 having the center of gravity on the tip end side in the axial direction X, stress is likely to be applied to the welded part 4. Even in such a case, effects of suppressing disconnection and the like caused by thermal stress can be obtained by having the volume ratio of the oxide particles P be 0.08 vol % or more, and further, effects of suppressing coarsening of crystals by heat can be obtained when the volume ratio of the oxide particles P is 0.08 vol % or more. Therefore, it is possible to retain the strength of the welded part over an extended period of time and to suppress strength deterioration thereof.

The welded part interface region 41 is formed between the welded part main region 42 and the lead wire 22 or the core wire 31, and since cooling and solidifying thereof is faster than those of the welded part main region 42, the crystal particles K1 are relatively small. That is, the average particle diameter of the crystal particles K1 in the welded part interface region 41 is smaller than the average particle diameter of the crystal particles K2 in the welded part main region 42, and "the welded part interface region 41<the welded part main region 42". As such, by having the average particle diameter in the welded part interface region 41 be smaller, effects of making the grain boundary area large and suppressing grain boundary shifts and crack growth are obtained.

Preferably, the average particle diameter of the crystal particles K1 is 6 μm or less. In particular, in a usage environment in which thermal stress is repeatedly applied in a temperature range of from room temperature to about 1050° C., a higher strength is required for the welded part 4.

In order to make the strength of the welded part interface region 41 higher than the stress applied to the welded part interface region 41, it is better that the crystal particle diameter is smaller than that obtained from the Hall-Petch equation (Formula 3) to be described later, and when the average particle diameter is 6 μm or less, the effect of improving strength is enhanced. The crystal particles K2 in the welded part main region 42 have an average particle diameter larger than that of the welded part interface region 41, for example, larger than 6 μm.

In the base material M of the lead wire 22, the aspect ratio (i.e., b/a; see FIG. 4), which is the ratio of the longer side length b to the shorter side length a of the crystal particles K, is, for example, 10 or more. In addition, the crystal particles K1 in the welded part interface region 41 have an aspect ratio of, for example, about 1 to 3, and the crystal particles K2 in the welded part main region 42 also have an aspect ratio equivalent to that of the welded part interface region 41, for example, about 1 to 3. The crystal particles K3 in the base material M1 of the core wire 31 desirably have the same aspect ratio as that of the lead wire 22, for example, 10 or more.

Further, regarding the welded part interface region 41 which is the outermost layer part of the welded part 4 and the welded part main region 42 which is an inner layer part, the volume ratio occupied by the oxide particles P, the average particle diameters of the crystal particles K1 and K2 and the like can be adjusted, for example, by controlling conditions such as welding time and temperature.

Figure 5:
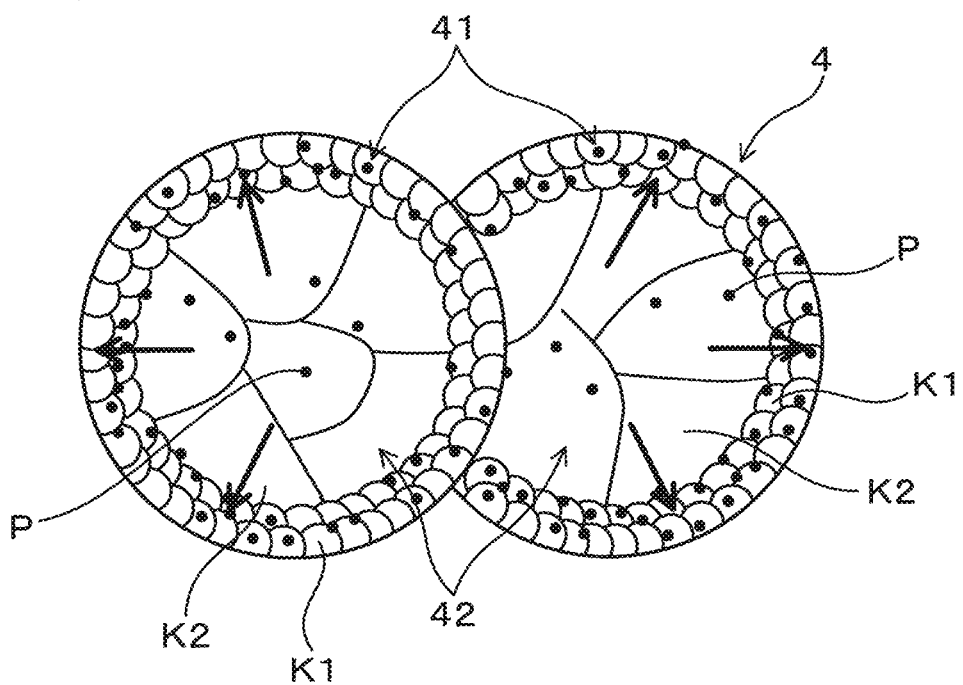
FIG. 5 is a schematic cross-sectional view showing migration of the oxide particles to the welded part interface region during welding of the first embodiment.

In general, the specific gravity of the oxide particles P is smaller than that of a noble metal constituting the base material M, for example, the specific gravity of $ZrO_2$ is 5.7 as compared to the specific gravity of Pt of 21.5. As such, as schematically shown in FIG. 5, in a molten state, oxide particles P which are lighter are likely to be pushed out to the outer peripheral side of the welded part main region 42 (for example, indicated by the arrows in FIG. 5). However, since a portion melted by the welding heat is solidified from the outer peripheral side caused by heat withdrawal, movement of the oxide particles P to the interface is not sufficiently realized when the solidification is fast. Therefore, for example, by increasing the welding time, it is possible to disperse more oxide particles P in the welded part interface region 41 by applying the difference in specific gravity between the base material M and the oxide particles P.

Next, the functional effects by the temperature sensor 1 of the present embodiment are described.

Figure 6:
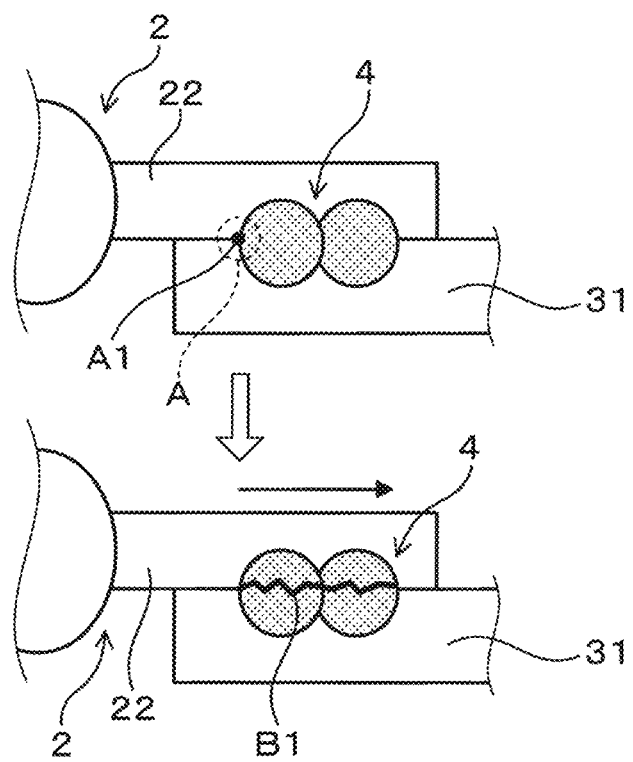
FIG. 6 is a schematic cross-sectional view showing an example of a crack developed in the welded part in a conventional temperature sensor in use in a high temperature environment.

As shown in FIG. 6 as a conventional example, when the lead wire 22 of the thermistor element 2 and the core wire 31 of the sheath pin 3 are lap welded, strength deterioration of the welded part 4 is likely to occur. This is because, in the welded part 4, the base material is melted at a melting point or higher by applying welding heat, and the oxide particles P are likely to move easily, resulting in local dispersibility deterioration and volume ratio reduction. In addition, when a pinning force by the oxide particles P is impaired, coarsening of particles is likely to occur by application of a thermal load, and a desired strength cannot be obtained.

Furthermore, since welding of the lead wire 22 and the core wire 31 are performed with different materials having different thermal expansion coefficients, stress concentration occurs in the welded part 4. In particular, in the interface region of the tip end side of the thermistor element 2, the tip end region A including the tip end part A1 adjacent to a butt welding part between the lead wire 22 and the core wire 31 is a stress concentration part (i.e., the weakest part) that is the weakest against stress. This is because the structure is such that the thermistor element 2 is supported at the tip end of the sheath pin 3, and although the filler 6 is filled in the cover 5 to support the thermistor element 2, the thermistor element 2 and the lead wire 22 are displaced as the cover 5 expands and contracts due to drastic temperature change of the exhaust gas and the like.

Figure 7:
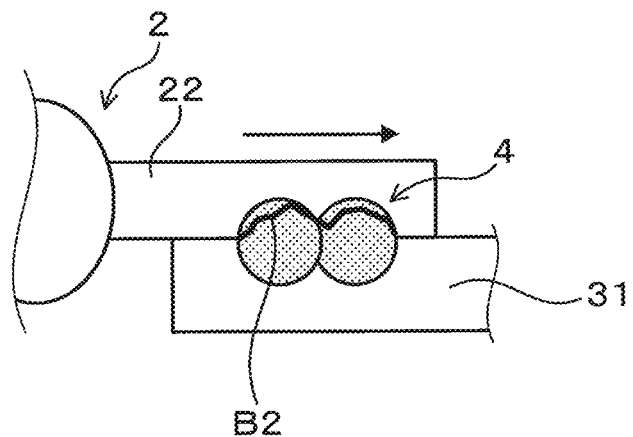
FIG. 7 is a schematic cross-sectional view showing another example of a crack developed in a welded part of a conventional temperature sensor in use in a high temperature environment.

As such, as shown in the upper diagram of FIG. 6, when a thermal stress is applied to the welded part 4, as shown in the bottom diagram of FIG. 6, for example, a crack B1 develops originating from the tip end part A1 contacting the lead wire 22, and proceeding towards the base end side along the butt welding part of the lead wire 22 and the core wire 31. Alternatively, as shown in FIG. 7, a crack B2 develops proceeding towards the base end side along the interface on the lead wire 22 side where the base material strength is relatively low. These cracks B1 and B2 may cause a crack in the welded part 4 to develop and may lead to disconnection.

On the other hand, in the present embodiment, as shown in FIG. 2, the volume ratio of the oxide particles P in the welded part interface region 41 between the welded part main region 42 and the lead wire 22 or the core wire 31 is larger than that in the welded part main region 42. That is, it is possible to improve strength by dispersing more oxide particles P in the outermost layer part of the welded part 4. This effect can be explained by the Orowan equation shown in Formula 1 mentioned below. For example, when the dispersed particle radius r (i.e., the radius of the oxide particles P) and the rigidity modulus μ are constant, the larger the volume ratio f is, the larger the Orowan stress τ_OR required to deform a material will be. That is, the material is strengthened by dispersion and the strength is improved.

[Orowan Equation]

$$\tau\_OR = (0.7\ \mu b\sqrt{f})/r \quad \text{Formula 1:}$$

wherein,
τ_OR: Orowan stress
μ: Rigidity modulus
b: Burgers vector
f: Volume ratio
r: Dispersed particle radius In addition, according to the Zener formula shown in Formula 2 mentioned below, in the welded part interface region 41 in which the oxide particles P are collected, since the grain boundaries are pinned by the oxide particles P by the volume ratio f growing large, grain growth of crystals can be hindered.

[Zener Equation]

$$Pi = 3\sigma f/2r \quad \text{Formula 2:}$$

wherein,
Pi: Pinning force
σ: Grain boundary energy
f: Volume ratio
r: Dispersed particle radius (i.e., oxide particle radius)

Furthermore, as a result of suppressing coarsening of particles, according to the Hall-Petch equation shown in Formula 3 mentioned below, by the crystal particle diameter becoming small, a yield stress σs grows larger. Thereby, strength can be further improved.

[Hall-Petch Equation]

$$\sigma s = \sigma_0 + (k/\sqrt{d}) \quad \text{Formula 3:}$$

wherein,

σs: Yield stress
$\sigma_0$: Yield stress of single crystal
k: Proportional constant
d: Crystal particle diameter

TEST EXAMPLES

The temperature sensor 1 having the welded part 4 shown in the first embodiment mentioned above was prepared (i.e., Example 1), and tests were conducted to confirm the structure of the bonded part of the thermistor element 2, and concurrently to confirm the durability thereof in a manner mentioned below. In these tests, the lead wire 22 of the thermistor element 2 was an oxide dispersion strengthened platinum wire, and was composed of a material in which zirconia was dispersed as oxide particles P in platinum as a base material M. The material of the core wire 31 of the sheath pin 3 was NCF601, which is an Ni—Cr—Fe nickel alloy. The lead wire 22 of the thermistor element 2 and the core wire 31 of the sheath pin 3 were bonded together by lap welding using laser welding. By adjusting the welding time at the time, the welded part interface region 41 in which more oxide particles P were dispersed was formed outside the welded part interface region 41.

Figure 8:
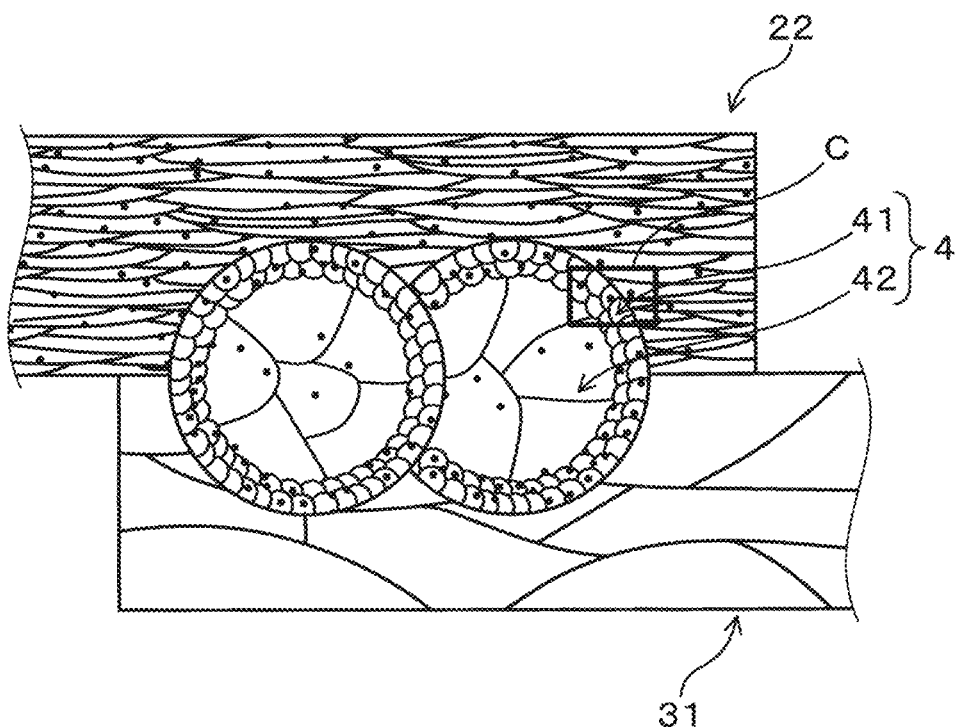
FIG. 8 is a partially enlarged cross-sectional view schematically showing a structure in the vicinity of a welded part of an element of a temperature sensor in Example.
Figure 9:
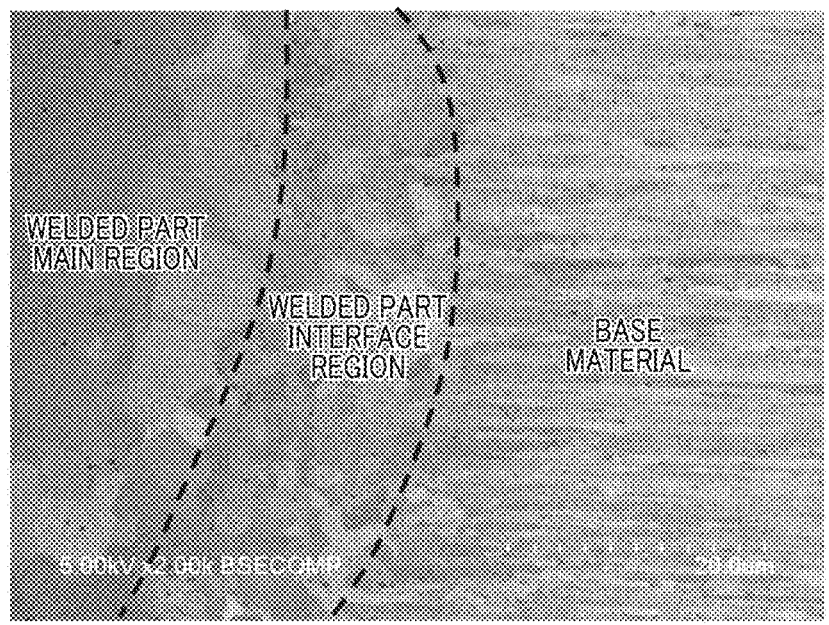
FIG. 9 is an observation image with a scanning type electron microscope in the vicinity of an interface of a welded part of an element in an example, and it is an enlarged view of a portion C of FIG. 8.

Regarding the temperature sensor 1 of Example 1, a sample, in which the bonded part of the lead wire 22 and the core wire 31 was cut in the element longer side direction) (i.e., the axial direction X), and the cross section was ground, was prepared. An observation image of the sample is shown in FIG. 9. FIG. 9 corresponds to a region in which a portion including the interface of the welded part 4 (for example, portion C in FIG. 8) is enlarged in the butt-welding part of the lead wire 22 and the core wire 31 shown in FIG. 8. As shown in FIG. 9, it was confirmed that the welded part interface region 41 in which the oxide particles P were dispersed was formed at the interface with the lead wire 22 (i.e., the base material shown in the figure) in the region including the interface of the welded part 4.

The volume ratio of the oxide particles P in each of the welded part interface region 41 and the inner welded part 4 (i.e., the welded part main region 42) was 0.1 vol % in the welded part interface region 41, and was 0.05 vol % in the welded part main region 42. In addition, the method of calculating the volume ratio was as follows. That is, after grinding and polishing the cross-section as mentioned above, an EPMA (i.e., an electron probe microanalyzer) analysis was performed on the surface where ion milling was applied, and the oxide particles P were detected. In addition, diameters of the oxide particles P present in each of the regions of the welded part interface region 41 and the welded part main region 42 were measured on the cross-section where ion milling was performed, and volume of the oxide particles P was determined on the assumption that the oxide particles P were spheres. The value was divided by the volume of each region, and the value obtained as such was assumed to be the volume ratio.

Further, the aspect ratio of the platinum particles of the platinum wire which is the lead wire 22 was about 50, the aspect ratio of the crystal particles in the welded part interface region 41 was about 1.8, and the average particle diameter was about 3.2 μm. In addition, the aspect ratio of the crystal particles in the welded part main region 42 was about 2.4, and the average particle diameter was about 96 μm.

In addition, tests for confirming durability of the welded part 4 were performed by repeatedly exerting heat impact on the welded part 4 of Example 1. At this time, changing the temperature between room temperature and 1050° C. assumed to be an exhaust gas temperature in an internal combustion engine was set as one cycle of heat impact on the temperature sensor 1, and 10,000 cycles of heat impact were repeatedly exerted. occurring. The results for durability were evaluated based on the presence or absence of damage to the welded part interface region 41 after the tests, and the results are shown in TABLE 1 stating "absent" when no damage was inflicted and "present" when damage was inflicted.

Next, in the same manner as in Example 1, the temperature sensor 1, in which the volume ratio of the oxide particles P in the welded part interface region 41 was changed to 0.08 vol % or 1.5 vol %, was prepared (i.e., Examples 2 and 3). Similarly, the results of tests performed to confirm durability by heat impact are also shown in TABLE 1. In addition, in Examples 2 and 3, it was confirmed that the volume ratio of the oxide particles P in the welded part main region 42 is smaller than 0.08 vol % or 1.5 vol %, and is smaller than the volume ratio of the oxide particles P in the welded part interface region 41.

In addition, for the sake of comparison, the temperature sensor 1 having the volume ratio in the welded part interface region 41 of 0% or 0.01% was prepared (i.e., Comparative Examples 1 and 2), and similarly, results of tests performed to confirm durability by heat impact are also shown in TABLE 1. Further, in Comparative Examples 1 and 2, the volume ratio of the oxide particles P in the welded part main region 42 and that in the welded part interface region 41 were comparable.

TABLE 1

| Examples Comparative Examples | Volume ratio of oxide particles (vol %) | Durability results (Presence or absence of damage) |
|---|---|---|
| Example 1 | 0.1 | Absent |
| Example 2 | 0.08 | Absent |
| Example 3 | 1.5 | Absent |
| Comparative Example 1 | 0 | Present |
| Comparative Example 2 | 0.01 | Present |

As is clear from TABLE 1, in Comparative Examples 1 and 2, damage was inflicted in the welded part interface region 41, whereas in Examples 1 to 3, no damage such as a crack or the like was found in any welded part interface region 41. As a result, in the welded part interface region 41, when the volume fraction of the oxide particles P is larger than that of the welded part main region 42, in particular when it is in the range of 0.08 vol % or more, even if the volume ratio of the oxide particles P is smaller in the welded part main region 42, it can be understood that the strength of the welded part 4 is sufficiently improved and durability against thermal stress can be enhanced.

Second Embodiment

A second embodiment according to a temperature sensor shall be described with reference to FIG. 10 to FIG. 13.

A temperature sensor 1 of the present embodiment is a modification example of the first embodiment mentioned above, and the basic structure of the temperature sensor 1 is the same as that of the first embodiment mentioned above, and therefore illustrations and descriptions thereof are abbreviated. In the present embodiment, the volume ratio of the oxide particles P in the welded part interface region 41 is made larger at the stress concentration part. Hereinafter, differences shall be mainly described.

Further, of the reference signs used from the second embodiment onwards, those that are the same as the reference signs used in the already-described embodiments represent the same components as those in the already-described embodiments unless otherwise indicated.

Figure 10:
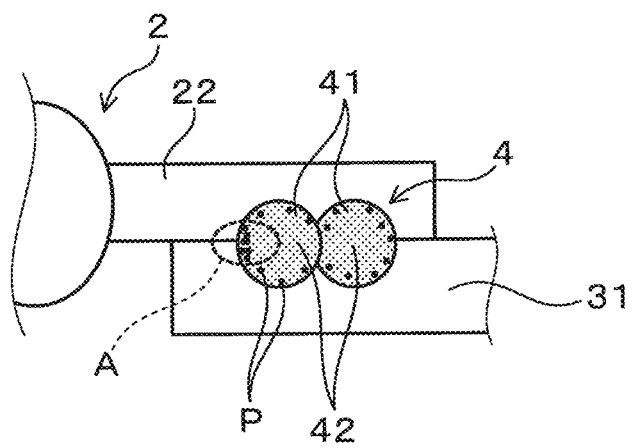
FIG. 10 is a schematic diagram showing a structure in the vicinity of a welded part of an element of a temperature sensor of a second embodiment.

As schematically shown in FIG. 10, also in the temperature sensor 1 of the present embodiment, the lead wire 22 drawn out to the base end side of the thermistor element 2 and the core wire 31 drawn out to the tip end side of the sheath pin 3 (not shown in the figure) are electrically connected by lap welding. At this time, similarly to the first embodiment mentioned above, for example, portions of two welding points are welded so as to overlap with each other, and the welded part interface region 41 is formed in the welded part 4 on the outside of the welded part main region 42 along the interface with the lead wire 22 or the core wire 31. Moreover, in the welded part interface region 41, in the tip end region A which is to be a stress concentration part, and including the tip end part in the axial direction X adjacent to the butt welding part where the lead wire 22 and the core wire 31 overlap with each other, the volume ratio of the dispersed oxide particles P is higher than that of other regions.

In the present embodiment, in the tip end region A which is the weakest part, the effects shown in Formula 1 to Formula 3 mentioned above can be enhanced by having the volume ratio of the oxide particles P be higher. Therefore, it is possible to further improve the strength and to reduce the crystal particle diameter, and even if stress concentrates on the tip end region A, coarsening, cracking and the like can be prevented. Therefore, tolerance to thermal stress is improved, strength deterioration can be suppressed, and reliability can be improved.

As such, the oxide particles P dispersed in the welded part interface region 41 do not need to be evenly present throughout the region, and, for example, it is possible to adjust the amount of the oxide particles P present (i.e., the volume ratio) so that the amount present would be larger in regions where stress is likely to concentrate.

Next, when bonding the lead wire 22 and the core wire 31 together by lap welding, one example of a method of adjusting the volume ratio of the oxide particles P shall be described. For example, in order to increase the volume fraction of the oxide particles P in the tip end region A, it is possible to have more oxide particles P collected in the tip end region A side by adjusting the conditions such as the welding sequence of a plurality of welding points. the welding time and the like.

Figure 11:
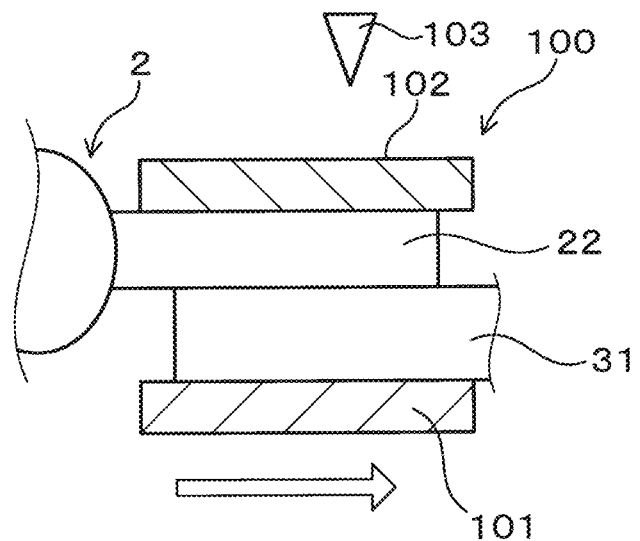
FIG. 11 is a schematic composition diagram of a welding device for explaining a method of welding a lead wire and a signal wire of the temperature sensor of the second embodiment.
Figure 12:
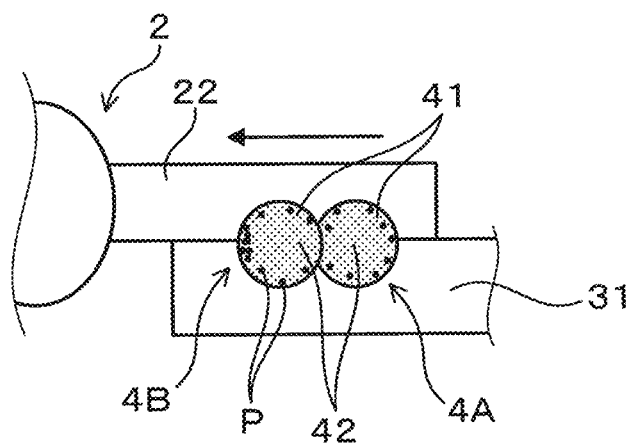
FIG. 12 is a schematic diagram showing a structure in the vicinity of the welded part for explaining the method of welding the lead wire and the signal wire of the temperature sensor of the second embodiment.

As shown in FIG. 11, when using a welding device 100 using laser irradiation, the lead wire 22 and the core wire 31 are overlappingly arranged on a movable lower press jig 101, and they are held between the lower press jig 101 and the upper press jig 102. Further, of the two welding points, the part farther away from the thermistor element 2 (for example, 4A in FIG. 12) is first arranged below a laser irradiation port 103 and laser welding is performed. Next, before the welded part interface region 41 is solidified, the lower press jig 101 is promptly moved horizontally (for example, as indicated by arrows in FIG. 11 and FIG. 12), and a part closer to the thermistor element 2 (for example, 4B in FIG. 12) is overlapped and welded to the previous welding point.

At this time, before the previous laser irradiated part is solidified, it is integrated with a molten part of the next laser irradiated part, and the oxide particles P are extruded from the part melted by the previous laser irradiation to the part melted by the next laser irradiation. Since the oxide particles P are extruded towards the tip end side of the axial direction X in an approximately horizontal direction from the part where the molten parts overlap (i.e., a direction along the butt welding part of the lead wire 22 and the core wire 31), more oxide particles P are likely to be collected in the interface on the tip end side. In addition, in the next welding, by having the cooling time after the peak holding time be relatively short, prompt solidification can be made possible in a state where more oxide particles P are collected in the interface on the tip end side.

Third Embodiment

A third embodiment according to a temperature sensor shall be described with reference to FIG. 13.

The temperature sensor 1 of the present embodiment is a modification example of the first embodiment mentioned above, and the oxide particles P are dispersed not only in the lead wire 22 but also in the core wire 31. Since the basic structure of the temperature sensor 1 is the same as that of the first embodiment mentioned above, the description thereof shall be abbreviated, and hereinafter the description shall be focused on differences.

Figure 13:
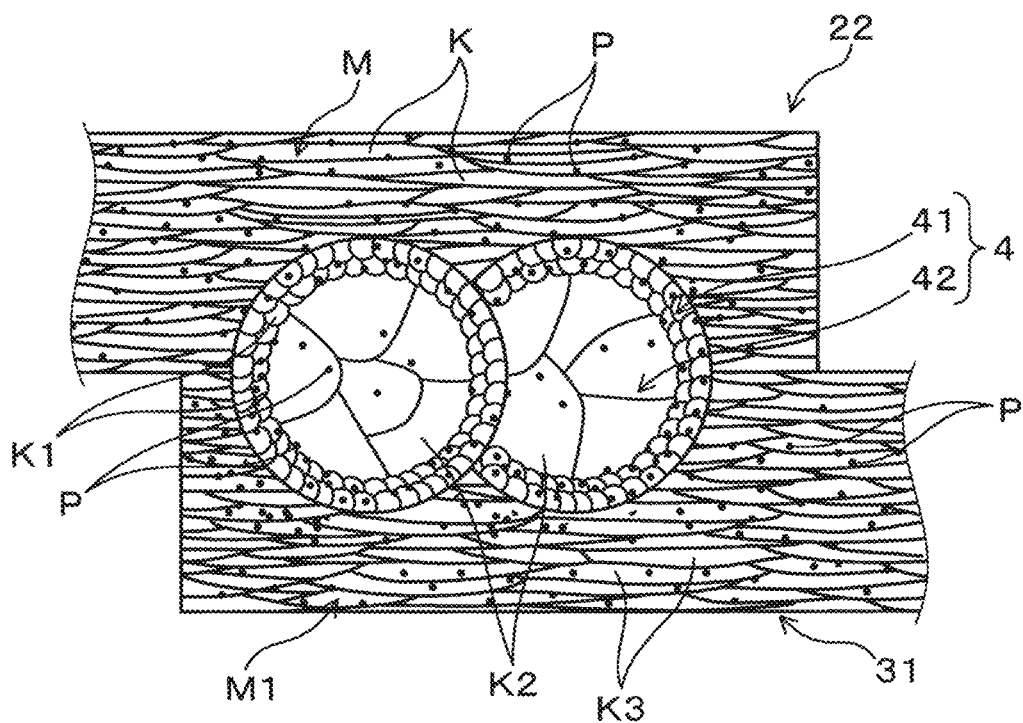
FIG. 13 is a partially enlarged cross-sectional view schematically showing a structure in the vicinity of a welded part of an element of a temperature sensor of a third embodiment.

As schematically shown in FIG. 13, the temperature sensor 1 of the present embodiment has the lead wire 22 drawn out to the base end side of the thermistor element 2, and it is electrically connected by lap welding to the core wire 31 drawn out to the tip end side of the sheath pin 3 (not shown in the figure). At this time, the lead wire 22 is, for example, a noble metal wire in which oxide particles P are dispersed in a base material M such as platinum, a platinum alloy or the like, and the core wire 31 uses, for example, an alloy wire in which oxide particles P are dispersed in a base material M1 such as a nickel alloy.

The lead wire 22 is overlapped with the core wire 31 and welded together. Here, similarly to the first embodiment, in the welded part 4 in which portions of two welding points are overlapped, the welded part main region 42 and the welded part interface region 41 surrounding the outer periphery thereof are formed. In the present embodiment as well, the volume ratio of the oxide particles P dispersed in the welded part interface region 41 is larger than that of the welded part main region 42.

In the present embodiment, since the oxide particles P are contained in both the lead wire 22 and the core wire 31, more oxide particles P are taken into the portions that melt during welding. As such, the amount of the oxide particles P present in the welded part interface region 41 is further increased, and the strength of the welded part 4 is further improved. Therefore, resistance to thermal stress is improved, strength deterioration can be suppressed, and reliability can be improved.

Fourth Embodiment

A fourth embodiment according to a temperature sensor shall be described with reference to FIG. 14 and FIG. 15.

A temperature sensor 1 of the present embodiment is a modification example of the first embodiment mentioned above, and the basic structure of the temperature sensor 1 is the same as that of the first embodiment mentioned above, and therefore descriptions thereof are abbreviated, and descriptions hereinafter shall be focused on differences.

Figure 14:
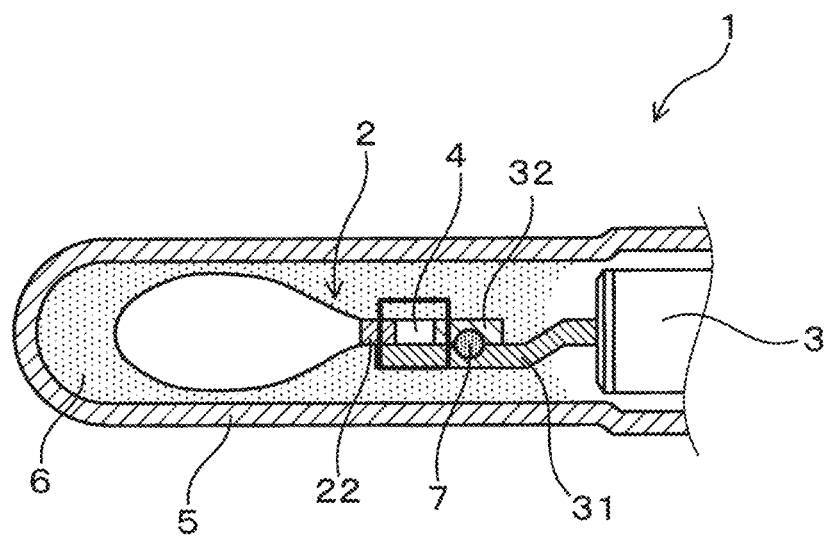
FIG. 14 is a cross-sectional view along the axial direction of the main part of a temperature sensor of a fourth embodiment.
Figure 15:
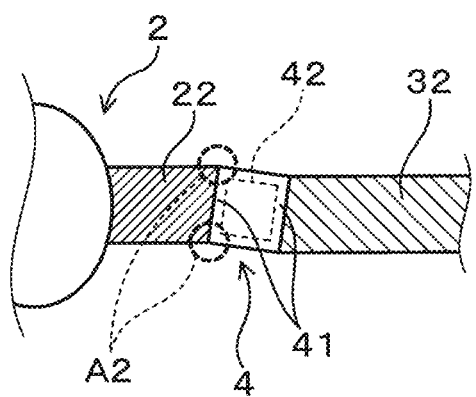
FIG. 15 is a schematic cross-sectional view in the vicinity of the welded part for explaining a stress applied to the welded part when using the temperature sensor of the fourth embodiment.

As schematically shown in FIG. 14, the temperature sensor 1 of the present embodiment also has the lead wire 22 drawn out to the base end side of the thermistor element 2, and it is electrically connected to the core wire 31 drawn out to the tip end side of the sheath pin 3 (not shown in the figure) via a joint wire 32.

In the present embodiment, the lead wire 22 and the joint wire 32, which is lap welded to the core wire 31, are bonded together by butt welding. A welded part 4 is formed between the lead wire 22 and the joint wire 32 by butt welding. In the welded part 4 as well, as schematically shown in FIG. 15, the welded part main region 42 and the welded part interface region 41 in the outside thereof are formed, and the welded part interface region 41 is arranged along the interface with the lead wire 22 or the joint wire 32. A welded part 7 is formed between the joint wire 32 and the core wire 31 by lap welding.

Similarly to the first embodiment mentioned above, the lead wire 22 is a noble metal wire in which oxide particles P are dispersed in a base material M such as platinum, a platinum alloy or the like, and the core wire 31 is composed of, for example, an alloy wire having a base material M1 such as a nickel alloy or the like. The joint wire 32 lap welded to the core wire 31 similarly may be an alloy wire made of a nickel alloy or the like. In addition, as in the third embodiment, it may be of a structure in which the oxide particles P are dispersed in the base material M1 of the core wire 31 or the joint wire 32. Further, the strength of the weld part 4 can be improved by having the volume ratio of the oxide particles P disperse in the welded part interface region 41 be larger than that in the welded part main region 42.

In the composition of the present embodiment as well, the stress applied to the welded part 4 is concentrated on the tip end side of the end part of the welded part 4 that is closer to the thermistor element 2. In particular, in the welded part interface region 41 forming an interface with the lead wire 22 of the thermistor element 2, the tip end edge region A2 exposed on the outer surface is a stress concentration part. In this case as well, the welded part interface region 41 is formed on the tip end side of the welded part 4, and by the volume ratio of the oxide particles P growing higher in the tip end edge region A2, which is the weakest part, similar effects as those of the first embodiment can be obtained. Therefore, resistance to thermal stress is improved, strength deterioration can be suppressed, and reliability can be improved.

Further, when using an alloy wire in which the oxide particles P are dispersed in the core wire 31 or the joint wire 32, it is possible to form a welded part interface region having a larger volume ratio of the oxide particles P in the outer periphery of the welded part main region also for the welded part 7, and the strength of the welded part 7 can be further improved.

The present disclosure is not limited to each of the embodiments mentioned above, and it can be applied to various embodiments without departing from the scope of the disclosure.

For example, in the embodiments mentioned above, a thermistor element is used as an element. However, any element using a resistor whose resistance value changes with temperature may be used. For example, an element using a platinum temperature measuring resistor or the like may be used.

In addition, other embodiments may adequately combine the embodiments mentioned above.

What is claimed is:

1. A temperature sensor, wherein the temperature sensor is provided with: an element that comprises a resistor which has a resistance value that changes with temperature thereof, and a lead wire drawn out from the resistor;
a signal wire that is bonded to the lead wire by welding; and
a cover that covers the element and a welded part between the lead wire and the signal wire,
wherein the lead wire comprises a material in which oxide particles are dispersed in platinum or platinum alloy; and
the welded part has a welded part interface region along an interface with the lead wire or the signal wire, and a welded part main region inside thereof, and a first volume ratio of the oxide particles occupying the welded part interface region is larger than a second volume ratio of the oxide particles occupying the welded part main region, the first volume ratio of the oxide particles indicating a ratio of a volume of the oxide particles, which are present in the welded part interface region, to a volume of the welded part interface region, the second volume ratio of the oxide particles indicating a ratio of a volume of the oxide particles, which are present in the welded part main region, to a volume of the welded part main region.

2. The temperature sensor according to claim 1, wherein an average particle diameter of crystals composing the welded part interface region is smaller than an average particle diameter of crystals composing the welded part.

3. The temperature sensor according to claim 1, wherein, in the welded part interface region, a third volume ratio of the oxide particles in a first region including an end on the resistor side is larger than a fourth volume ratio of the oxide particles in a second region corresponding to another region, to third volume ratio of the oxide particles indicating a ratio of a volume of the oxide particles, which are present in the first region, to a volume of the first region, the fourth volume ratio fo the oxide particles indicating a ratio of a volume of the oxide particles, which are present in the second region, to a volume of the second region.

4. The temperature sensor according to claim 1, wherein, in the welded part, the first volume ratio is 0.08 vol % or more.

5. The temperature sensor according to claim 1, wherein the signal wire comprises a material in which the oxide particles are dispersed in a metal base material (M1).

6. The temperature sensor according to claim 1, wherein the oxide particles are made of at least one selected from zirconia, yttria, and alumina.

7. The temperature sensor according to claim 1, wherein crystal particles in the welded part interface region have an aspect ratio that is equivalent to an aspect ratio of crystal particles in the welded part main region.

* * * * *